(12) United States Patent
Baek

(10) Patent No.: US 11,815,143 B2
(45) Date of Patent: Nov. 14, 2023

(54) ELECTROMECHANICAL BRAKE

(71) Applicant: HL MANDO CORPORATION, Gyeonggi-do (KR)

(72) Inventor: Seungtae Baek, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 257 days.

(21) Appl. No.: 17/377,437

(22) Filed: Jul. 16, 2021

(65) Prior Publication Data

US 2022/0025947 A1 Jan. 27, 2022

(30) Foreign Application Priority Data

Jul. 21, 2020 (KR) .......................... 10-2020-0089962

(51) Int. Cl.
| | |
|---|---|
| *F16D 65/18* | (2006.01) |
| *F16D 127/02* | (2012.01) |
| *F16D 121/24* | (2012.01) |
| *B60T 13/74* | (2006.01) |
| *F16D 55/226* | (2006.01) |
| *B60T 1/06* | (2006.01) |
| *F16D 125/40* | (2012.01) |

(52) U.S. Cl.
CPC .............. *F16D 65/18* (2013.01); *B60T 1/065* (2013.01); *B60T 13/746* (2013.01); *F16D 55/226* (2013.01); *F16D 2121/24* (2013.01); *F16D 2125/40* (2013.01); *F16D 2127/02* (2013.01)

(58) Field of Classification Search
CPC .... F16D 65/18; F16D 65/183; F16D 2125/36; F16D 2125/40; F16D 2121/24; F16D 2127/02; F16D 55/226; B60T 13/741; B60T 13/746
See application file for complete search history.

(56) References Cited

U.S. PATENT DOCUMENTS

| | | | |
|---|---|---|---|
| 2011/0308898 A1* | 12/2011 | Shiraki | ................. B60T 13/741 188/72.4 |
| 2018/0148030 A1* | 5/2018 | Kim | ...................... B60T 13/588 |
| 2018/0298969 A1* | 10/2018 | Demorais | ............. F16D 55/226 |
| 2019/0277355 A1* | 9/2019 | Kim | ........................ F16D 65/18 |

FOREIGN PATENT DOCUMENTS

| | | | | |
|---|---|---|---|---|
| DE | 102012018133 A1 * | 3/2013 | ............ | B60T 13/741 |
| DE | 102020209292 A1 * | 8/2021 | ............. | B60T 1/065 |
| KR | 20200034103 A * | 3/2020 | | |

* cited by examiner

*Primary Examiner* — Vishal R Sahni

(74) *Attorney, Agent, or Firm* — Ladas & Parry, LLP

(57) ABSTRACT

Disclosed is an electromechanical brake including a piston provided to advance and retreat to press a brake pad, a power conversion unit including a spindle provided to rotate by receiving a driving force from an actuator, a nut connected to the spindle to advance or retreat inside the piston depending on rotation directions of the spindle to advance or retreat the piston, and a return means provided to forcibly retreat the piston when the nut retreats, wherein the return means includes a locking protrusion provided to protrude in a radial direction from an outer surface of the nut, and a groove portion provided on an inner surface of the piston to allow the locking protrusion to be inserted.

7 Claims, 12 Drawing Sheets

ELECTROMECHANICAL BRAKE

CROSS-REFERENCE TO RELATED APPLICATION(S)

This application is based on and claims priority under 35 U.S.C. § 119 to Korean Patent Application No. 10-2020-0089962, filed on Jul. 21, 2020, in the Korean Intellectual Property Office, the disclosure of which is incorporated by reference herein in its entirety.

BACKGROUND

1. Field

The disclosure relates to an electromechanical brake, and more particularly, to an electromechanical brake for performing braking of a vehicle using a rotational driving force of a motor.

2. Description of the Related Art

A brake system for performing braking is essential to a vehicle, and various types of brake systems have been proposed for the safety of drivers and passengers.

A conventional brake system that supplies hydraulic pressure required for braking to wheel cylinders using a mechanically connected booster when a driver depresses a brake pedal has been mainly used. However, recently, as a next-generation brake system, an electromechanical brake system that receives a depressing force from the driver as an electric signal and operates an electric device such as a motor based on the electric signal to provide a braking force to a vehicle have been developed.

Such an electromechanical brake system converts a rotational force of a motor into a linear motion through the motor, a speed reducer, and the like to provide a clamping force to a brake disc, thereby performing a service brake and a parking brake of a vehicle.

On the other hand, a conventional hydraulic type brake system, which generates a braking force through hydraulic pressure, is configured to return a piston to its original position through a sealing member provided between a caliper housing and the piston when braking is released. That is, the sealing member is deformed as the piston is operated, and the piston is retreated and returned by an elastic restoring force of the sealing member. This is called a so-called roll-back, and when the roll-back does not act sufficiently, a drag phenomenon occurs in which friction occurs between a brake disc and a brake pad.

However, in an electromechanical (dry type) brake system which generates a braking force through an electric device without using hydraulic pressure, slip occurs between the piston and the sealing member, so that the roll-back function of the piston returning to its original position may be deteriorated. That is, the drag phenomenon may occur due to deterioration of the roll-back function.

SUMMARY

It is an aspect of the disclosure to provide an electromechanical brake capable of improving braking performance and suppressing braking noise and vibration by smoothly returning a piston to prevent a drag phenomenon when braking is released.

Additional aspects of the disclosure will be set forth in part in the description which follows and, in part, will be obvious from the description, or may be learned by practice of the disclosure.

In accordance with an aspect of the disclosure, an electromechanical brake includes a piston provided to advance and retreat to press a brake pad, a power conversion unit including a spindle provided to rotate by receiving a driving force from an actuator, a nut connected to the spindle to advance or retreat inside the piston depending on rotation directions of the spindle to advance or retreat the piston, and a return means provided to forcibly retreat the piston when the nut retreats, wherein the return means includes a locking protrusion provided to protrude in a radial direction from an outer surface of the nut, and a groove portion provided on an inner surface of the piston to allow the locking protrusion to be inserted.

A length of the groove portion may be provided longer than a length of the locking protrusion.

During the braking, the nut may advance to come into contact with the piston while the locking protrusion may be prevented from coming into contact with a front portion of the groove portion, and during braking release, the nut may retreat while the locking protrusion may come into contact with a rear portion of the groove portion to retreat the piston.

A plurality of the locking protrusions may be provided along an outer circumferential surface of the nut, and the groove portion may be formed in an annular shape along an inner circumferential surface of the piston.

The locking protrusion may have a predetermined rigidity and may be provided to be elastically deformable toward the center of the nut.

The return means may have a separation preventing structure to prevent the locking protrusion from being separated from the groove portion.

The groove portion may include a first groove formed from a rear side of the piston to a front side, and a second groove formed in a circumferential direction from an end of the first groove.

The locking protrusion may be inserted into a position where the second groove is formed through the first groove, and the nut may be coupled by being rotated by a predetermined angle in the circumferential direction toward the second groove so that the locking protrusion is disposed in the second groove.

The nut may be provided with a coupling groove having a predetermined length to allow the locking protrusion to be installed, and the locking protrusion may include a coupling part having a length corresponding to a length of the coupling groove to be press-fitted into the coupling groove, an elastic part bent from one end of the coupling part to extend in a longitudinal direction of the coupling part and provided to be elastically deformable toward the coupling part, and a locking part provided at an end of the elastic part and protruding outward from the coupling groove to be inserted into the groove portion.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 1:
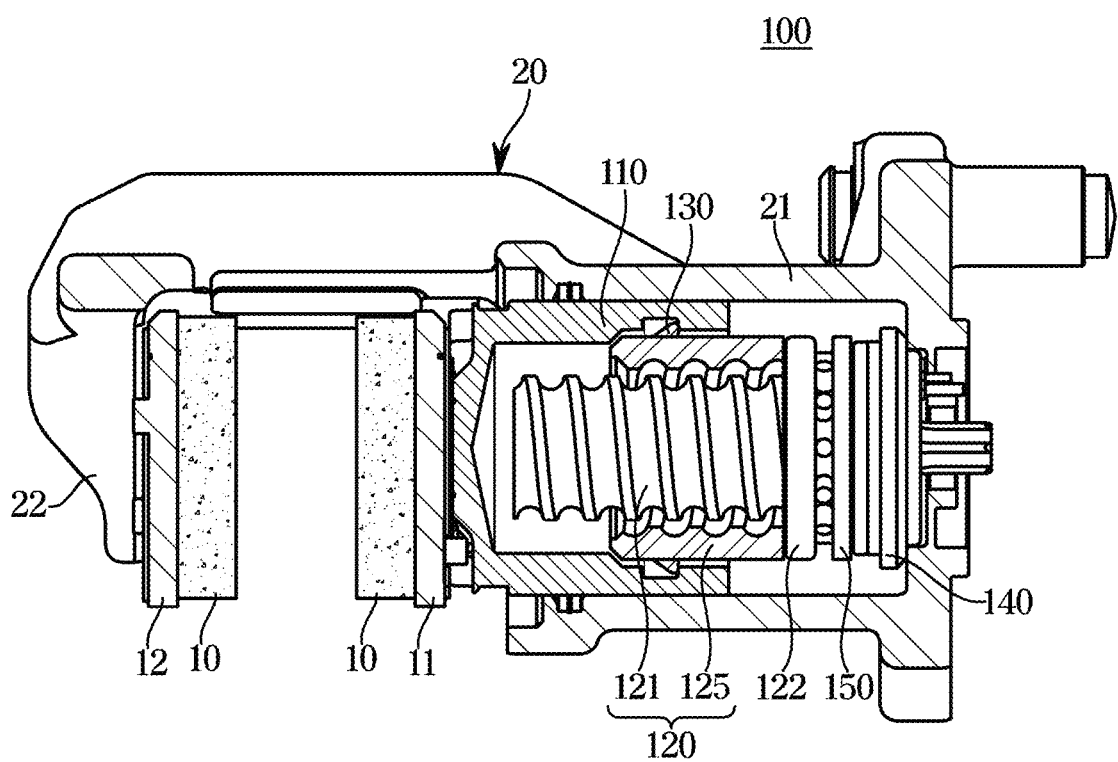
FIG. 1 is a side cross-sectional view of an electromechanical brake according to an embodiment of the disclosure.

FIG. 1 is a side cross-sectional view of an electromechanical brake according to an embodiment of the disclosure.

Referring to FIG. 1, an electromechanical brake 100 according to an embodiment of the disclosure may include a carrier (not shown) on which a pair of pad plates 11 and 12 are installed to press a brake disc (not shown) rotating together with a wheel of a vehicle, a caliper housing 20 slidably installed on the carrier to operate the pair of pad plates 11 and 12, a piston 110 installed in the caliper housing 20 to advance and retreat, an actuator (not shown) provided to generate and provide a rotational driving force for moving the piston 110, a power conversion unit 120 provided to convert the rotational driving force provided by the actuator into a linear motion and transmit the linear motion to the piston 110 so that the piston 110 advances and retreats in an axial direction, a return means for forcibly retreating the piston 110 when the piston 110 is retreated by the power conversion unit 120, a sensor 140 provided to detect a close contact force between the brake disc and a brake pad 10 or a fastening force of the brake pad 10, and an electronic control unit (not shown) provided to control the operation of the actuator based on information provided from the sensor 140.

The brake pad 10 is provided to be attached to an inner surface of each of the pair of pad plates 11 and 12. The pair of pad plates 11 and 12 include the inner pad plate 11 disposed to be in contact with the piston 110 and the outer pad plate 11 disposed to be in contact with a finger part 22 of the caliper housing 20, which will be described later, and are slidably installed on the carrier. That is, the pair of pad plates 11 and 12 are installed on the carrier fixed to a vehicle body to perform braking by advancing and retreating toward opposite sides of the brake disc.

The caliper housing 20 includes the finger part 22 formed to be bent downward on a front side (left side with reference to FIG. 1) to operate the outer pad plate 12, and a cylinder 21 in which the piston 110 is installed, and is slidably fastened to the carrier. The cylinder 21 and the finger part 22 are integrally formed. The caliper housing 20 as described above is slid from the carrier by a reaction force depending on the movement of the piston 110 during braking of the vehicle to be moved toward the brake disc, so that the outer pad plate 12 may approach the brake disc side by the finger part 22 to press the brake disc.

Figure 2:
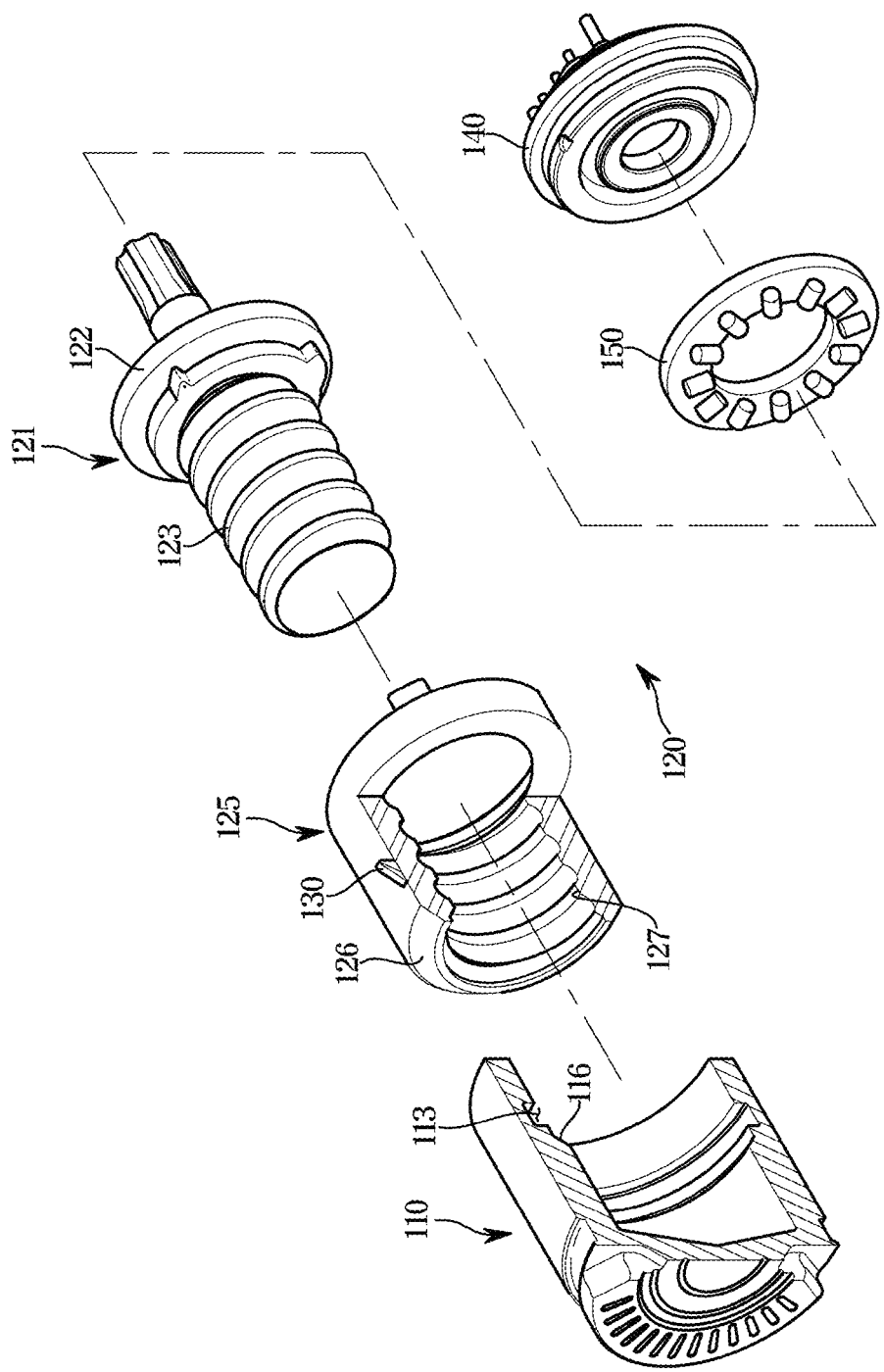
FIG. 2 is an exploded perspective view illustrating that a piston and a power conversion unit are coupled in the electromechanical brake according to an embodiment of the disclosure.
Figure 3:
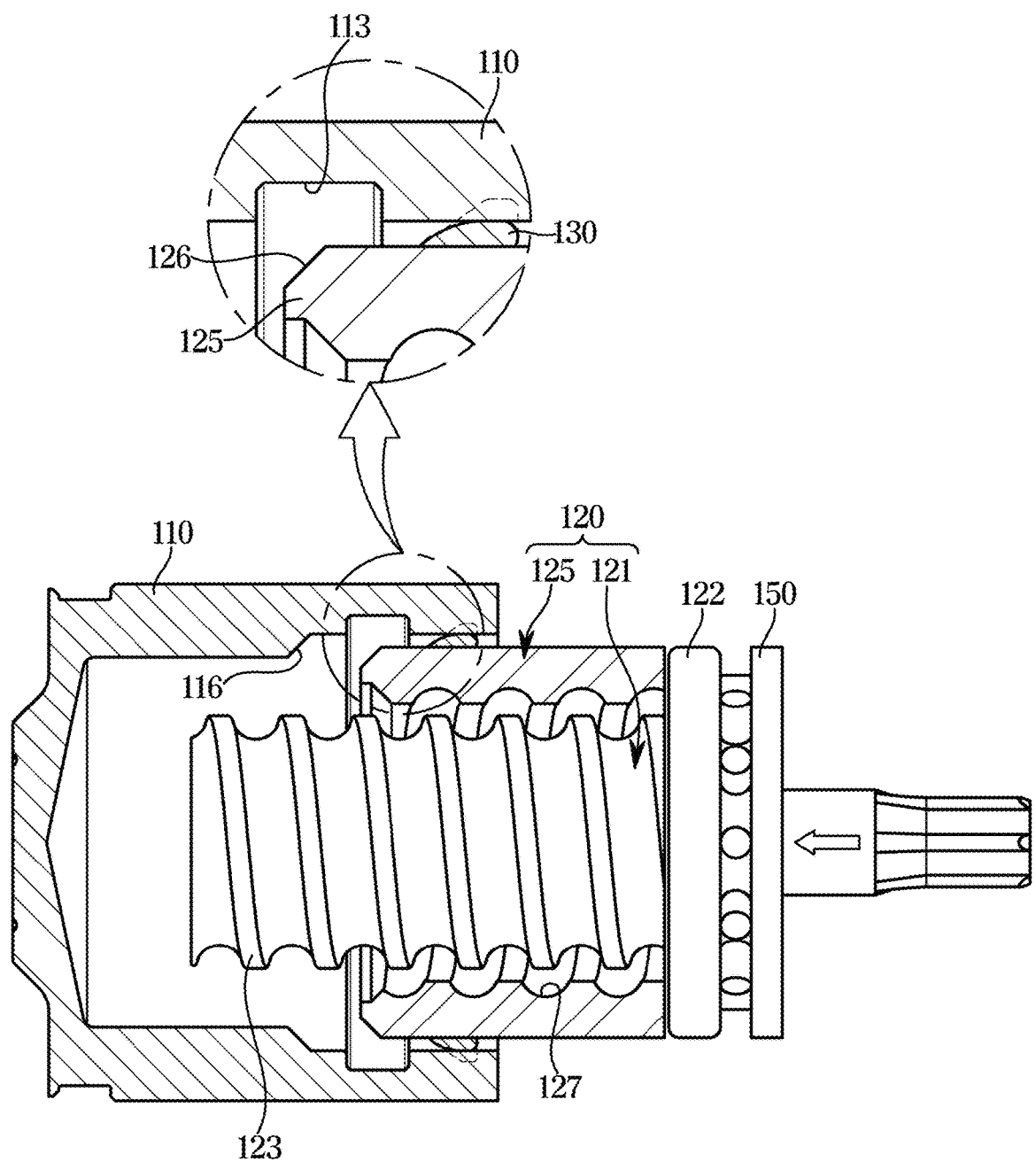
FIGS. 3 and 4 are views illustrating that a locking protrusion is coupled to a groove portion of the piston in the electromechanical brake according to an embodiment of the disclosure.
Figure 4:
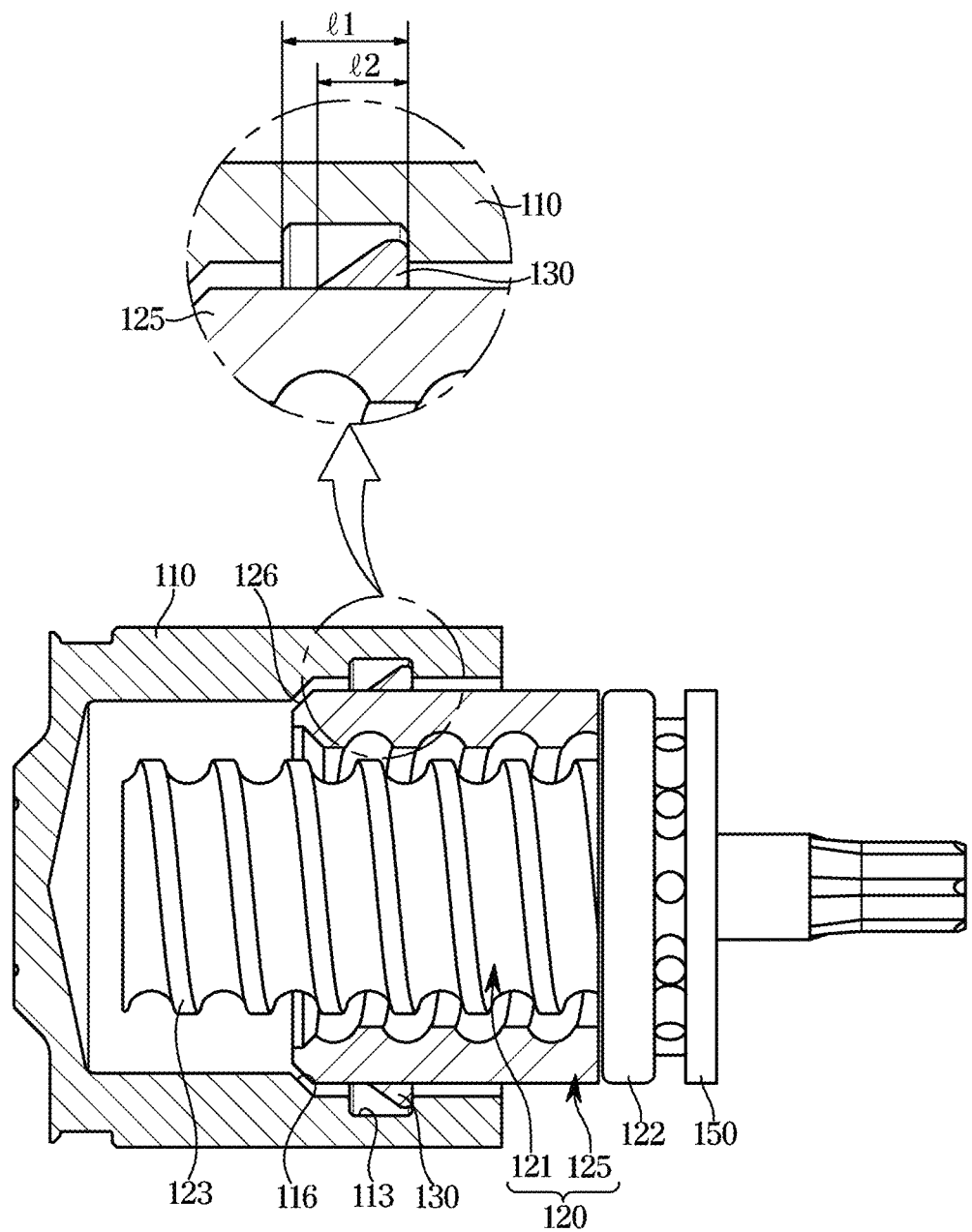

FIG. 2 is an exploded perspective view illustrating that a piston and a power conversion unit are coupled in the electromechanical brake according to an embodiment of the disclosure, and FIGS. 3 and 4 are views illustrating that a locking protrusion is coupled to a groove portion of the piston in the electromechanical brake according to an embodiment of the disclosure.

Referring to FIGS. 1 to 4, the piston 110 may be provided in a cup shape in which a rear side (right side in FIGS. 1 and 2) is open, and is slidably inserted inside the cylinder 21. The piston 110 presses the inner pad plate 11 toward the brake disc by an axial force of the power conversion unit 120 receiving the rotational force of the actuator. Accordingly, the piston 110 advances toward the inner pad plate 11 to press the inner pad plate 11, and the caliper housing 20 operates in the opposite direction to the piston 110 by a reaction force so that the finger part 22 presses the outer pad plate 12 toward the brake disc, thereby performing braking. A rotation preventing part (not shown) may be provided on the piston 110 so that the piston 110 may perform a linear motion toward the inner pad plate 11 side. For example, a protrusion is formed on an outer surface of the inner pad plate 11, that is, on one surface facing the piston 110, and a groove or a locking jaw, etc. on which the protrusion is caught may be provided in front of the piston 110, thereby preventing rotation of the piston 110.

A groove portion 113 is formed on an inner circumferential surface of the piston 110. The groove portion 113 may be formed in an annular shape along the inner circumferential surface of the piston 110. The groove portion 113 is a portion into which a locking protrusion 130, which will be described later, is inserted, and a coupling structure of the groove portion 113 and the locking protrusion 130 and an operation thereof will be described again below.

The power conversion unit 120 includes a spindle 121 provided to rotate by receiving a driving force from the actuator 160, a nut 125 disposed inside the piston 110 and screwed to the spindle 121 to advance together with the piston 110 by rotation of the spindle 121 in a first direction or retreat together with the piston 110 by rotation of the spindle 121 in a second direction, and a plurality of balls (not shown) interposed between the spindle 121 and the nut 125. The power conversion unit 120 as described above may be provided as a ball-screw type converter for converting a rotational motion of the spindle 121 into a linear motion.

The rotation of the spindle 121 in the first direction refers to a rotation direction in which the nut 125 is advanced by the rotation of the spindle 121, and the rotation of the spindle 121 in the second direction opposite to the first direction refers to a rotation direction in which the nut 125 retreats by the rotation of the spindle 121.

The spindle 121 is rotatably provided on the cylinder 21, and a flange 122 extending in a radial direction may be provided on the spindle 121. The flange 122 may be provided as a separate part and fixed to the spindle 121 to rotate integrally with the spindle 121. The spindle 121 may be provided such that one side (left) thereof is coupled to the nut 125 with respect to the flange 122 and the other side (right) is connected to the actuator 160, thereby receiving a driving force from the actuator 160. Accordingly, the one side of the spindle 121 may be inserted into the nut 125, and an external thread 123 may be formed on an outer circumferential surface thereof for coupling with the nut 125. A bearing 150, and the sensor 140 for detecting a fastening force between the brake disc 13 and the brake pad 10 by detecting a load applied to the spindle 121 may be disposed on the other side of the spindle 121.

The nut 125 may be formed in a hollow cylindrical shape such that one side of the spindle 121 is inserted therein, and an internal thread 127 that is engaged with the external thread 123 of the spindle 121 through the balls (not shown) may be formed on an inner circumferential surface of the nut 125. A portion of the nut 125 is inserted into and is disposed in the piston 110 together with one side of the spindle 121 through the open portion of the piston 110. In this case, because the nut 125 needs to be in contact with the piston 110 to press the piston 110 during linear motion, the inside of the piston 110 may be provided in a stepped structure to have a smaller diameter than a diameter of the nut 125. That is, a stepped portion 116 may be provided inside the piston 110 to be in contact with a front side of the nut 125, Accordingly, a pressing surface 126 corresponding to a contact surface of the stepped portion 116 may be provided on the front side of the nut 125 to be in contact with the stepped portion 116 to smoothly transmit a pressing force of the nut 125 to the piston 110.

The nut 125 needs to be provided such that rotation thereof is limited in order to linearly move according to the rotation of the spindle 121 in the first direction or the second direction. Accordingly, the piston 110 and the nut 125 need to have a structure in which a portion thereof has a protrusion or a groove or is formed in a plane so that rotation thereof is limited. Because the ball-screw type power conversion unit 120 is a well-known technology that is already widely applied, a detailed description of its operation will be omitted.

The actuator (not shown) may include a motor and a reduction device having a plurality of reduction gears and may receive power from a power supply device disposed in the vehicle to generate and provide a driving force. The actuator may be connected to the other end of the spindle 121 to transmit the generated driving force to the spindle 121, thereby rotating the spindle 121. The actuator may be installed on the outside of the caliper housing 20, and the reduction device may be provided in various structures such as a planetary gear assembly and a worm structure to reduce the power of the motor and provide the reduced power to the spindle 121.

The sensor 140 is provided to detect a close contact force or a fastening force between the brake disc and the brake pad 10. The sensor 140 may be provided as a force sensor that detects a fastening force between the brake disc and the brake pad 10 by detecting a load of the spindle 121 or the actuator, but not limited thereto. The sensor 140 may transmit the detected fastening force information of the brake pad 10 to the electronic control unit (not shown), and the electronic control unit may determine wear or drag of the brake pad 10 based on the fastening force information detected by the sensor 140.

The return means forcibly retreats the piston 110 when the nut 125 retreats to prevent a drag phenomenon. Accordingly, the return means may include the locking protrusion 130 provided to protrude in a radial direction from an outer surface of the nut 125, and the groove portion 113 formed on an inner surface of the piston 110. That is, the return means has a structure in which the locking protrusion 130 is inserted into the groove portion 113 so that the piston 110 moves together by the locking protrusion 130 when the nut 125 retreats.

More specifically, a plurality of the locking protrusions 130 may be provided along an outer circumferential surface of the nut 125. The groove portion 113 may be formed in an annular shape on the inner surface of the piston 110. In this case, the groove portion 113 is provided to be located at the rear of a position where the stepped portion 116 of the piston 110 is formed. The locking protrusion 130 and the groove portion 113 as described above are formed at positions corresponding to each other. That is, when the nut 125 is inserted into the piston 110 by an appropriate distance required, the locking protrusion 130 may be inserted into the groove portion 113.

The locking protrusion 130 is provided such that a front side (left) thereof is inclined and a rear side (right) thereof has a vertical surface. This is to allow the locking protrusion 130 to be easily inserted into the piston 110 when the nut 125 is inserted into the piston 110 and to maintain the locking protrusion 130 a state of being caught on the piston 110 without being separated from the groove portion 113 in a state in which the locking protrusion 130 is inserted into the groove portion 113 to smoothly retreat the piston 110.

The locking protrusion 130 has a predetermined rigidity and may be provided to be elastically deformable toward the center of the nut 125. For example, the locking protrusion 130 may be formed of a reinforced plastic or rubber material. Accordingly, when the nut 125 provided with the locking protrusion 130 is inserted into and disposed in the piston 110, the locking protrusion 130 is elastically deformed between the piston 110 and the nut 125 (see FIG. 3), and when the locking protrusion 130 is located in the groove portion 113, the locking protrusion 130 is restored to its original state and stably positioned in the groove portion 113 (see FIG. 4).

A length l1 of the groove portion 113 may be longer than a length l2 of the locking protrusion 130. Accordingly, during the braking, the nut 125 advances according to the rotation of the spindle 121 in the first direction and the pressing surface 126 comes into contact with the stepped portion 116 of the piston 110 while the locking protrusion 130 may be prevented from coming into contact with a front portion of the groove portion 113, and during braking release, the nut 125 retreats according to the rotation of the spindle 121 in the second direction and the locking protrusion 130 comes into contact with a rear portion of the groove portion 113 to retreat the piston 110.

The reason that the length l1 of the groove portion 113 is set larger than the length l2 of the locking protrusion 130 is to prevent damage that may occur when the locking protrusion 130 comes into close contact with the groove portion 113 as the pressing force generated during the braking acts greatly. That is, because a large load is not required when braking is released compared to when the braking is performed, any material may be used as long as the locking protrusion 130 may withstand a sliding resistance of approximately 100 to 200N.

Figure 5:
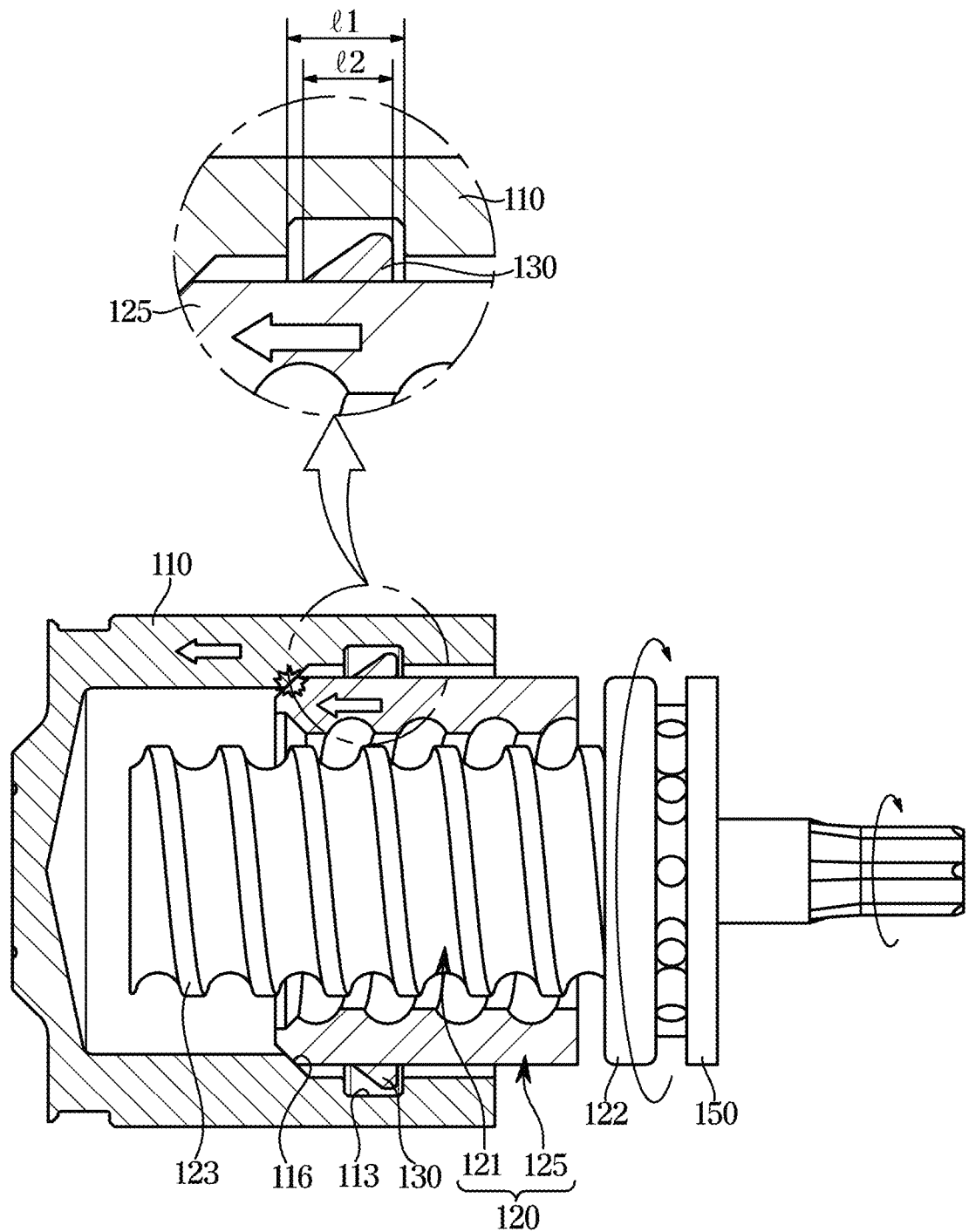
FIG. 5 is a cross-sectional view illustrating an operation of the piston and the power conversion unit during braking in the electromechanical brake according to an embodiment of the disclosure.
Figure 6:
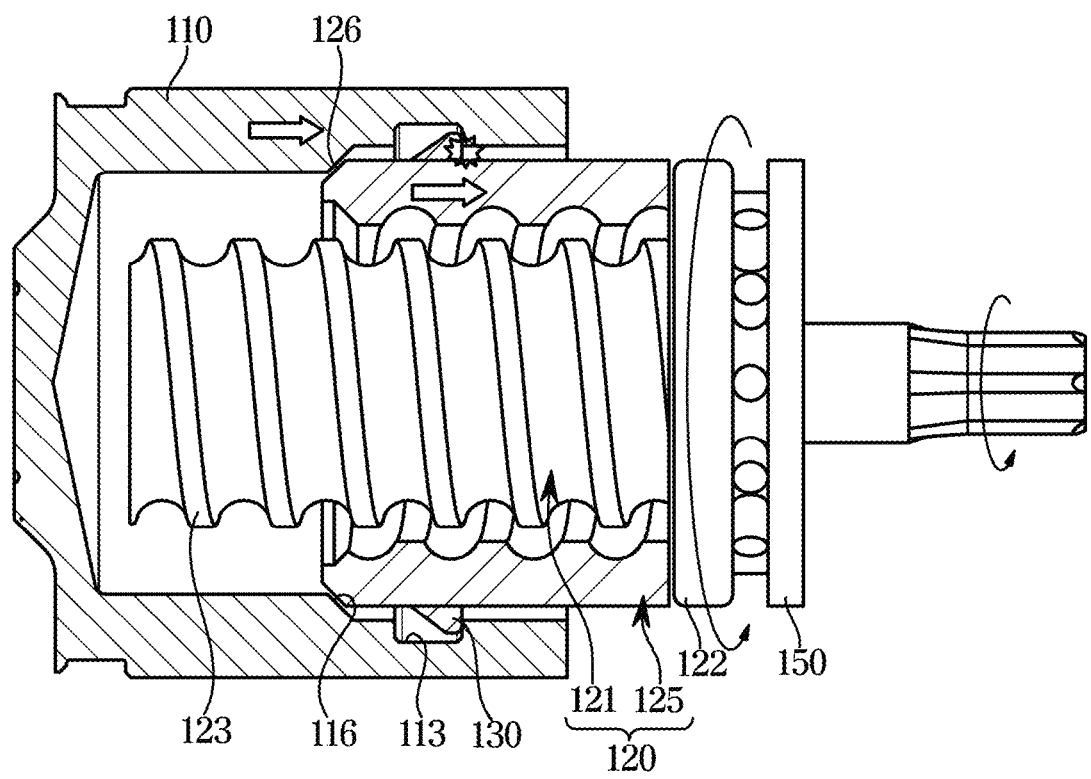
FIG. 6 is a cross-sectional view illustrating an operation of the piston and the power conversion unit during braking release in the electromechanical brake according to an embodiment of the disclosure.

Therefore, as illustrated in FIG. 5, when the nut 125 linearly moves by the rotation of the spindle 121 in the first direction during the braking and the pressing surface 126 comes into contact with the stepped portion 116 to press the piston 110 toward the inner pad plate 11, the locking protrusion 130 does not come into contact with the front portion of the groove portion 113. Also, as illustrated in FIG. 6, when the nut 125 moves to the rear side by the rotation of the spindle 121 in the second direction during the braking release, the locking protrusion 130 comes into contact with the rear portion of the groove portion 113 to retreat together with the piston 110. That is, as the piston 110 is forcibly retreated, the drag phenomenon may be prevented. In addition, as the locking protrusion 130 is formed of a reinforced plastic or rubber material, noise due to the contact between the locking protrusion 130 and the piston 110 may be minimized.

This embodiment illustrates that the pressing surface 126 of the nut 125 and the stepped portion 116 of the piston 110 are spaced apart from each other by a predetermined distance before braking of the vehicle, but is not limited thereto, and as long as the front side of the locking protrusion 130 does not come into contact with one end (front) of the groove portion 113, the pressing surface 126 and the stepped portion 116 may be provided to be in contact with each other.

According to the disclosure, the return means may have a separation preventing structure to prevent the locking protrusion 130 from being separated from the groove portion 113. That is, this embodiment illustrates that the locking protrusion 130 is prevented from being separated from the groove portion 113 as the locking protrusion 130 is formed of an elastically deformable material and is inserted into the piston 110 together with the nut 125 to protrude into the groove portion 113, but is not limited thereto, and the locking protrusion 130 may be coupled in various ways so as not to be separated from the groove portion 113. For example, FIGS. 7 to 9 illustrate a return means provided with a separation preventing structure according to another embodiment of the disclosure.

Figure 7:
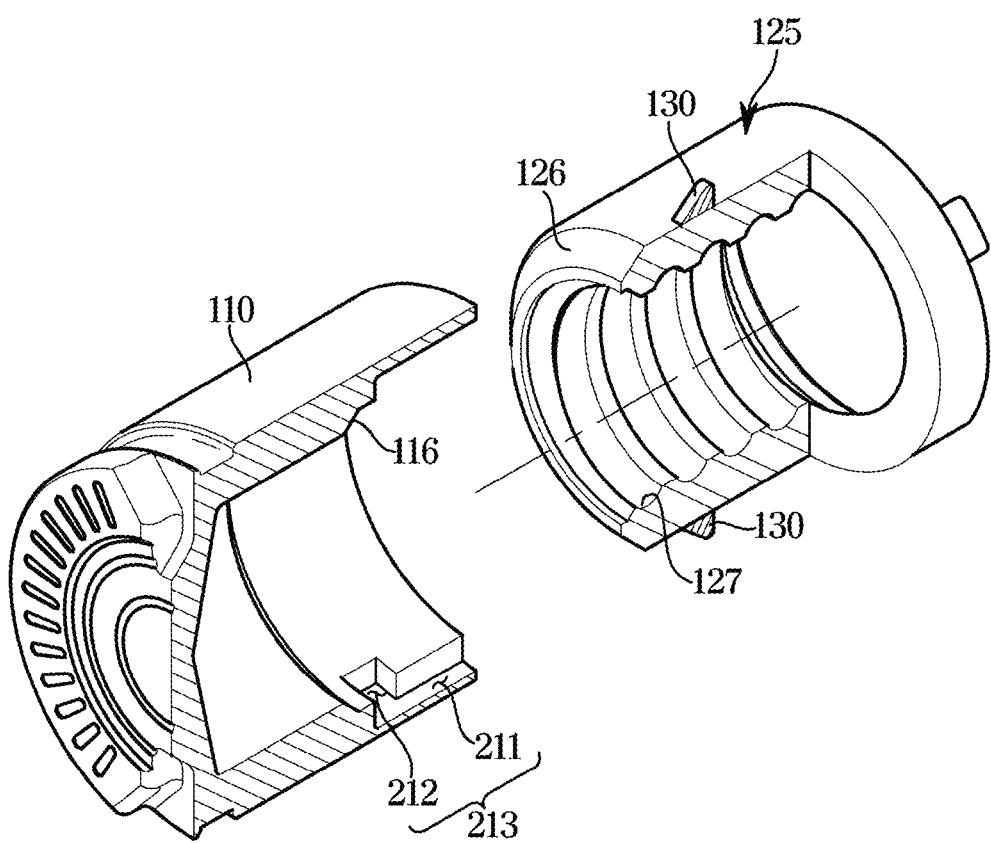
FIG. 7 is an exploded perspective view illustrating that a piston and a power conversion unit are coupled in an electromechanical brake according to another embodiment of the disclosure.
Figure 8:
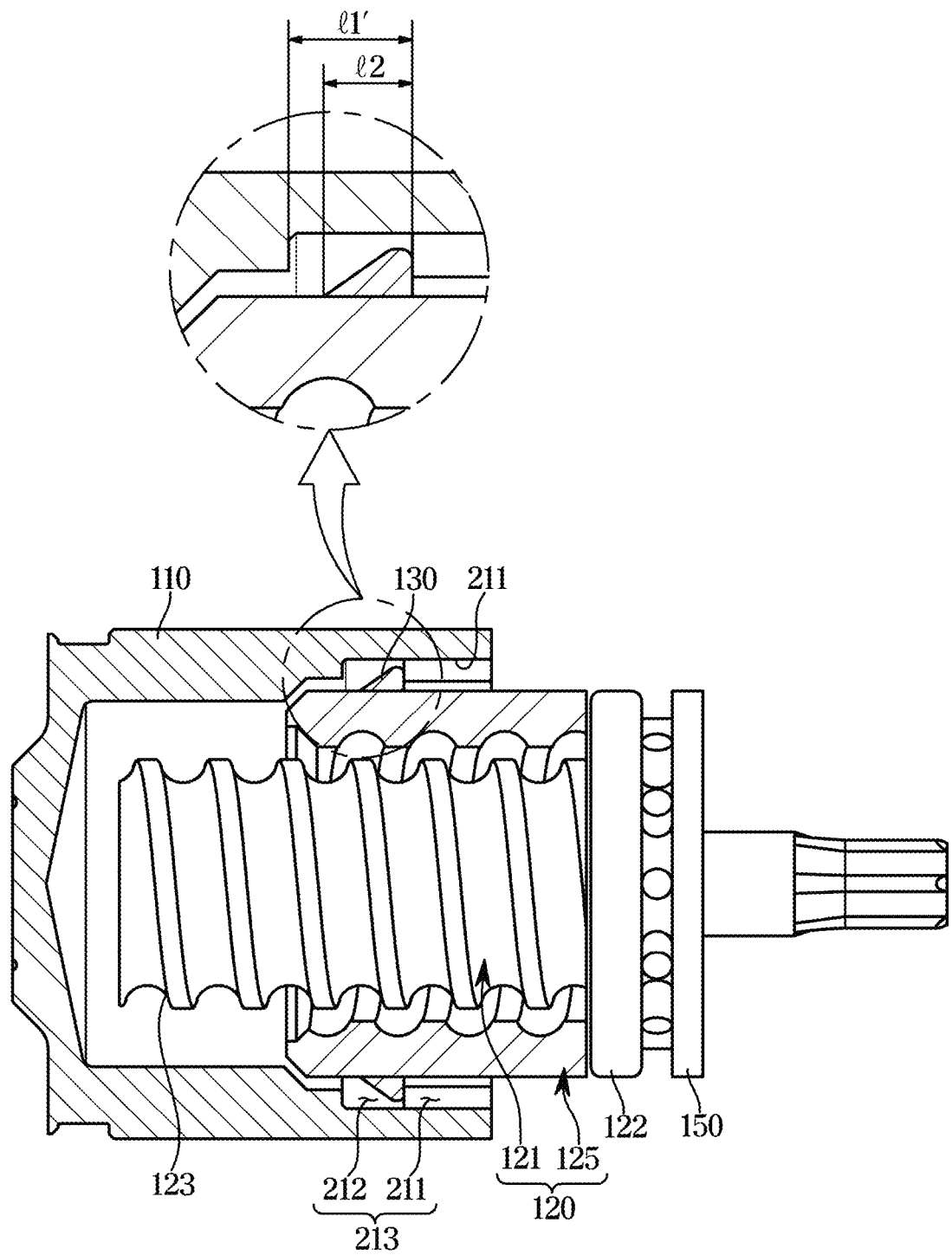
FIGS. 8 and 9 are views illustrating that a locking protrusion of a nut is coupled to a groove portion of the piston in the electromechanical brake according to another embodiment of the disclosure.
Figure 9:
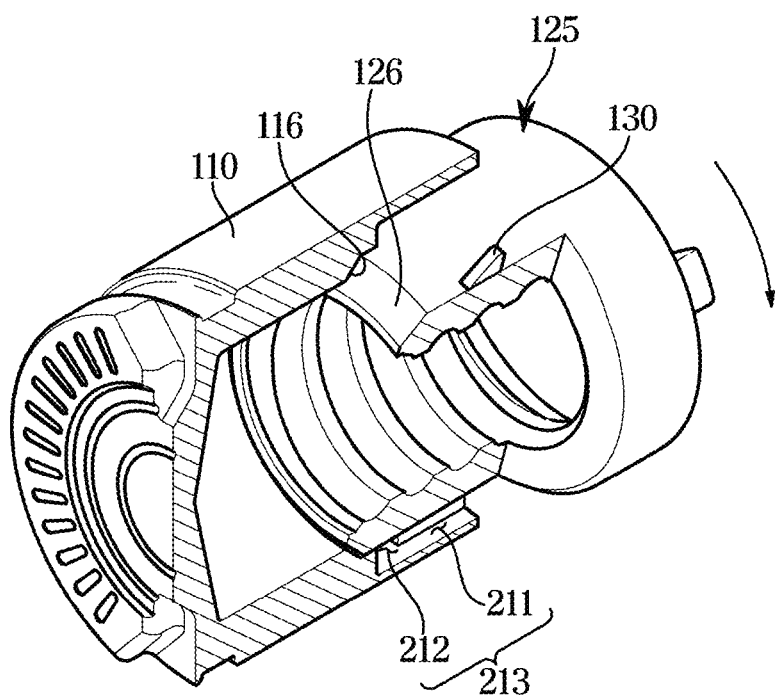

FIG. 7 is an exploded perspective view illustrating that a piston and a power conversion unit are coupled in an electromechanical brake according to another embodiment of the disclosure, and FIGS. 8 and 9 are views illustrating that a locking protrusion of a nut is coupled to a groove portion of the piston in the electromechanical brake according to another embodiment of the disclosure, Herein, the same reference numerals as in the drawings of the above-described embodiment indicate members having the same function.

Referring to FIGS. 7 to 9, like the above-described embodiment, an electromechanical brake according to another aspect of the disclosure has a mechanically coupled structure to forcibly retreat the piston 110 together with the nut 125 through the locking protrusion 130 when the braking is released.

The plurality of locking protrusions 130 may be provided along the outer circumferential surface of the nut 125.

The groove portion 213 provided on the inner circumferential surface of the piston 110 may include a first groove 211 formed from a rear side of the piston 110 to a front side, and a second groove 212 formed in a circumferential direction from an end of the first groove 211.

The locking protrusion 130 is inserted into a position where the second groove 212 is formed through the first groove 211, and when the locking protrusion 130 is disposed in the second groove 212, the nut 125 may be coupled by being rotated by a predetermined angle in the circumferential direction toward the second groove 212. Accordingly, as described in the previous embodiment, as the piston 110 and the nut 125 are provided in a state in which rotation thereof is limited, the locking protrusion 130 may be prevented from being separated from the groove portion 213, that is, the second groove 212.

A length l1' of the second groove 212 may be longer than the length l2 of the locking protrusion 130. Accordingly, during the braking, the nut 125 advances to come into contact with the piston 110 while the locking protrusion 130 is prevented from coming into contact with a front portion of the second groove 212, and during the braking release, when the nut 125 retreats, the locking protrusion 130 may come into contact with a rear portion of the second groove 212 to retreat the piston 110.

Figure 10:
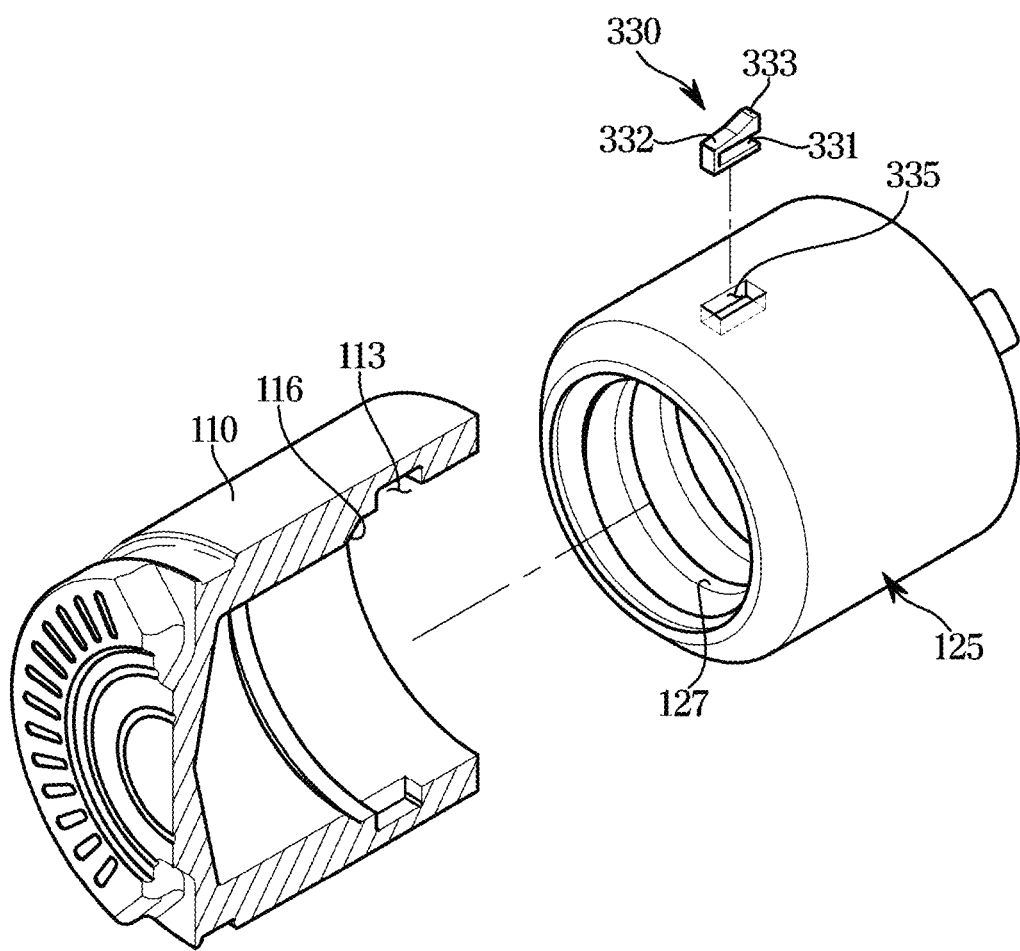
FIG. 10 is an exploded perspective view illustrating that a piston and a power conversion unit are coupled in an electromechanical brake according to another embodiment of the disclosure.
Figure 11:
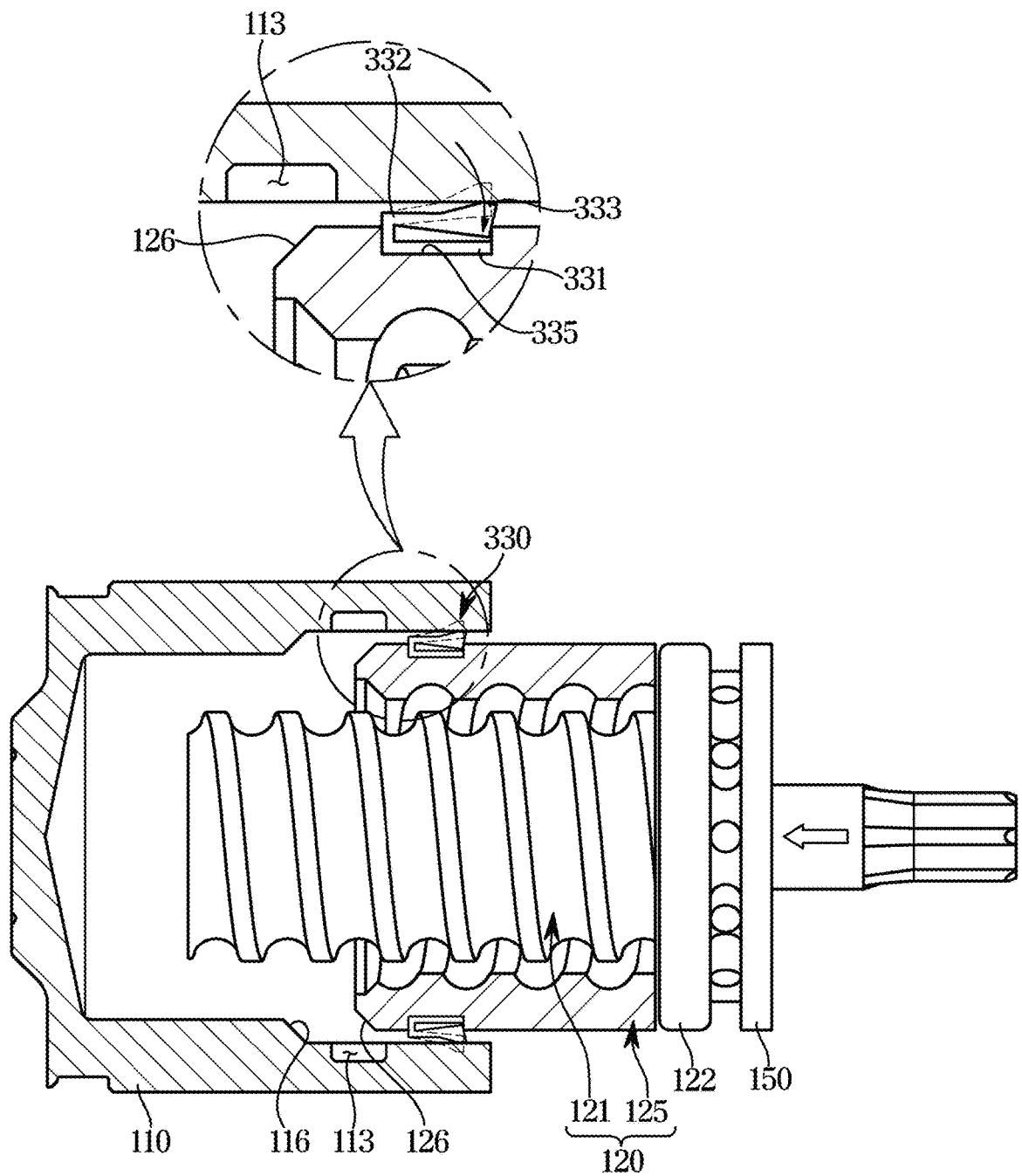
FIGS. 11 and 12 are views illustrating that a locking protrusion is coupled to a groove portion of the piston in the electromechanical brake according to another embodiment of the disclosure.
Figure 12:
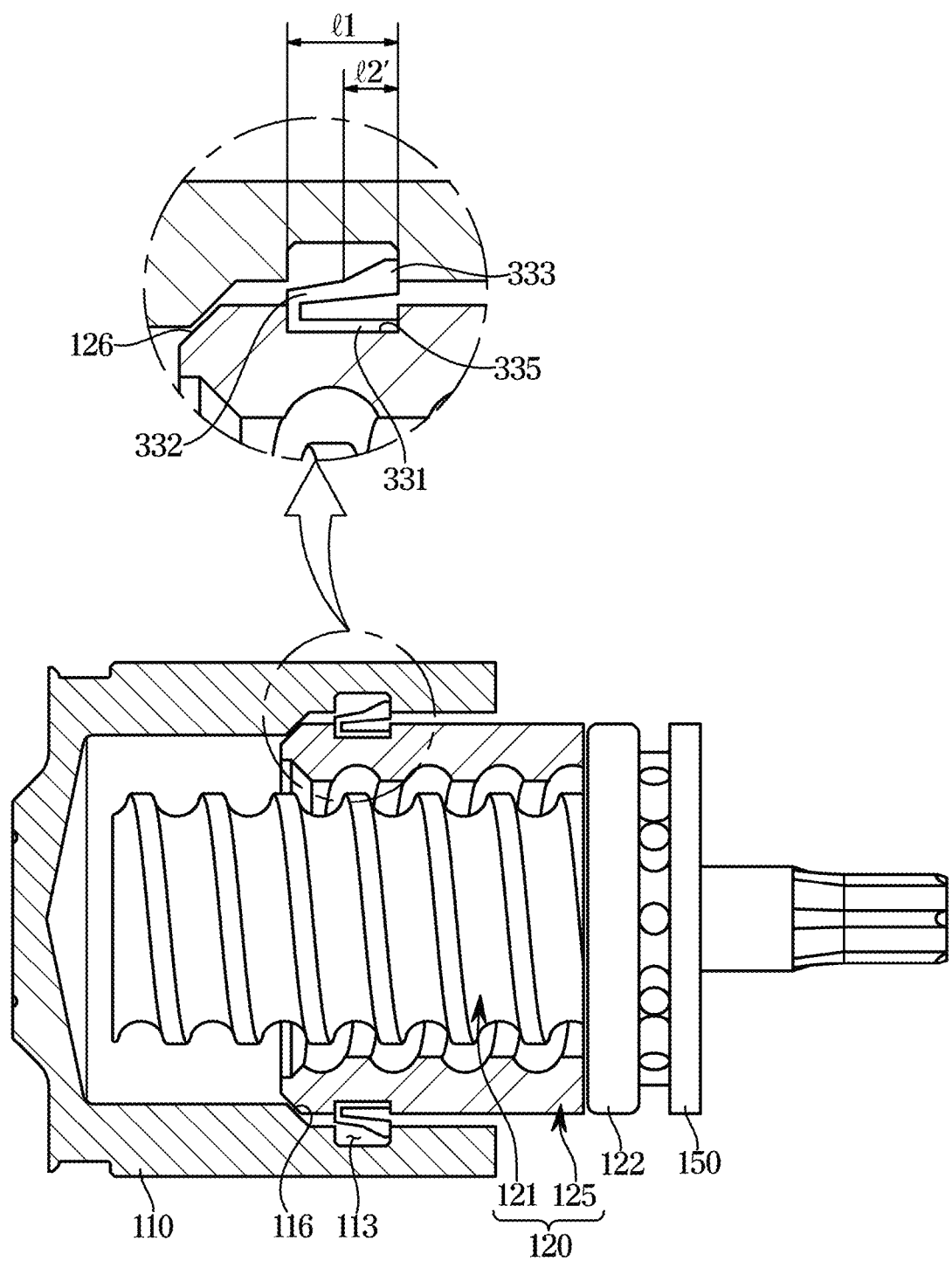

FIGS. 10 to 12 illustrate a return means provided with a separation preventing structure according to another embodiment of the disclosure.

FIG. 10 is an exploded perspective view illustrating that a piston and a power conversion unit are coupled in an electromechanical brake according to another embodiment of the disclosure, and FIGS. 11 and 12 are views illustrating that a locking protrusion is coupled to a groove portion of the piston in the electromechanical brake according to another embodiment of the disclosure. Herein, the same reference numerals as in the drawings of the above-described embodiments indicate members having the same function.

Referring to FIGS. 10 to 12, like the above-described embodiments, an electromechanical brake according to another aspect of the disclosure has a mechanically coupled structure to forcibly retreat the piston 110 together with the nut 125 through the locking protrusion 130 when the braking is released.

The groove portion 113 is formed on the inner circumferential surface of the piston 110. The groove portion 113 may be formed in an annular shape along the inner circumferential surface of the piston 110 to allow a locking protrusion 330, which will be described later, to be inserted.

A coupling groove 335 having a predetermined length is provided on the outer circumferential surface of the nut 125 to allow the locking protrusion 330 to be installed. The locking protrusion 330 may include a coupling part 331 having a length corresponding to a length of the coupling groove 335 to be press-fitted into the coupling groove 335, an elastic part 332 bent from one end of the coupling part 331 to extend in a longitudinal direction of the coupling part 331, and a locking part 333 provided at an end of the elastic part 332.

The coupling part 331 may be formed to have a shape corresponding to the coupling groove 335 to be press-fitted to the coupling groove 335.

As the elastic part 332 is bent from the coupling part 332 to face the coupling part 331 and to be spaced apart from the coupling part 331 by a predetermined distance, the elastic part 332 may be elastically deformed toward the coupling part 331. The locking part 333 provided at the end of the elastic part 332 may be provided to protrude outward from the coupling groove 335. Accordingly, when the locking protrusion 330 is coupled to the groove portion 113, the locking part 333 may be positioned in the groove portion 113.

That is, when the nut 125 is inserted into the piston 110, the locking part 333 and the elastic part 332 are inserted (elastically deformed) into the coupling groove 335 toward the coupling part 331, and when the locking part 333 is positioned in the groove portion 113, the locking part 333 pops out from the coupling groove 335 by an elastic restoring force of the elastic part 332 and is disposed in the groove portion 113. Accordingly, a rear side of the locking part 333 is in contact with a rear portion of the groove portion 113 so that the piston 110 is forcibly retreated together with the nut 125 when the nut 125 retreats.

The length l1 of the groove portion 113 may be longer than a length l2' of the locking part 333. Accordingly, during the braking, the nut 125 advances to come into contact with the piston 110 while the locking part 333 is prevented from coming into contact with the front portion of the groove portion 113, and during the braking release, when the nut 125 retreats, the locking part 333 may come into contact with the rear portion of the groove portion 113 to retreat the piston 110.

As described above, as the piston 110 is smoothly returned to its original position by the return means having various separation preventing structures to prevent the drag phenomenon, braking performance may be improved and braking noise and vibration may be suppressed.

As is apparent from the above, an electromechanical brake according to an embodiment of the disclosure can improve braking performance and suppress braking noise and vibration by smoothly returning a piston to prevent a drag phenomenon when braking is released.

While the disclosure has been particularly described with reference to exemplary embodiments, it should be understood by those of skilled in the art that various changes in form and details may be made without departing from the spirit and scope of the disclosure.

What is claimed is:

1. An electromechanical brake comprising:
   a piston provided to advance and retreat to press a brake pad;
   a power conversion unit comprising a spindle provided to rotate by receiving a driving force from an actuator, a nut connected to the spindle to advance or retreat inside the piston depending on rotation directions of the spindle to advance or retreat the piston; and
   a return means provided to forcibly retreat the piston when the nut retreats,
   wherein:
   the return means comprises:
   a locking protrusion provided to protrude in a radial direction from an outer surface of the nut,
   a groove portion provided on an inner surface of the piston to allow the locking protrusion to be inserted,
   the return means has a separation preventing structure to prevent the locking protrusion from being separated from the groove portion,
   the nut is provided with a coupling groove having a predetermined length to allow the locking protrusion to be installed, and
   the locking protrusion comprises: a coupling part having a length corresponding to a length of the coupling groove to be press-fitted into the coupling groove; an elastic part bent from one end of the coupling part to extend in a longitudinal direction of the coupling part and provided to be elastically deformable toward the coupling part; and a locking part provided at an end of the elastic part and protruding outward from the coupling groove to be inserted into the groove portion.

2. The electromechanical brake according to claim 1, wherein
   a length of the groove portion is provided longer than a length of the locking protrusion.

3. The electromechanical brake according to claim 1, wherein
   during the braking, the nut advances to come into contact with the piston while the locking protrusion is prevented from coming into contact with a front portion of the groove portion, and
   during braking release, the nut retreats while the locking protrusion comes into contact with a rear portion of the groove portion to retreat the piston.

4. The electromechanical brake according to claim 1, wherein
   a plurality of the locking protrusions is provided along an outer circumferential surface of the nut, and
   the groove portion is formed in an annular shape along an inner circumferential surface of the piston.

5. The electromechanical brake according to claim 1, wherein
   the locking protrusion is configured to be elastically deformable toward a center of the nut.

6. The electromechanical brake according to claim 1, wherein
   the groove portion comprises:
   a first groove formed from a rear side of the piston to a front side; and
   a second groove formed in a circumferential direction from an end of the first groove.

7. The electromechanical brake according to claim 6, wherein
   the locking protrusion is inserted into a position where the second groove is formed through the first groove, and
   the nut is coupled by being rotated by a predetermined angle in the circumferential direction toward the second groove so that the locking protrusion is disposed in the second groove.

* * * * *